United States Patent [19]

Bergum

[11] 3,770,504
[45] Nov. 6, 1973

[54] HIGH DISCHARGE RATE MULTICELL BATTERY

[75] Inventor: Bernard C. Bergum, Monona, Wis.

[73] Assignee: ESB Incorporated, Philadelphia, Pa.

[22] Filed: Dec. 21, 1970

[21] Appl. No.: 100,236

[52] U.S. Cl. .................................. 136/10, 136/111
[51] Int. Cl. ............................................ H01m 21/00
[58] Field of Search .................... 136/111, 10, 175, 136/108, 134–135, 83, 125–127, 103

[56] References Cited
UNITED STATES PATENTS

| | | | |
|---|---|---|---|
| 3,563,805 | 2/1971 | Deierhoi, Jr. | 136/111 |
| 3,306,777 | 2/1967 | Reid et al. | 136/111 |
| 2,870,235 | 1/1959 | Soltis | 136/111 |
| 2,519,054 | 8/1950 | Woodring | 136/111 |
| 2,715,652 | 8/1955 | Chubb et al. | 136/111 |
| 2,745,894 | 5/1956 | Nowotny | 136/111 |
| 3,004,093 | 10/1961 | Richter et al. | 136/175 |
| 3,076,052 | 1/1963 | Tamminen | 136/175 |
| 3,390,014 | 6/1968 | Eisler | 136/10 X |
| 3,488,220 | 1/1970 | Lyall et al. | 136/10 |
| 3,617,387 | 11/1971 | Grulke et al. | 136/111 |
| 2,701,272 | 2/1955 | Reiner | 136/111 |
| 2,762,858 | 9/1956 | Wood | 136/103 |
| 2,968,686 | 1/1961 | Duddy | 136/6 |

Primary Examiner—Anthony Skapars
Attorney—Robert H. Robinson, Raymond L. Balfour, Anthony L. Rossi and Thomas A. Lennox

[57] ABSTRACT

A thin, flat, multicell battery comprising a multiplicity of electrically conductive layers arranged in cooperative electrical association with one another to provide a plurality of cells. The layers include intercell connectors which cooperate together to form sealed enclosures for each cell, and to form electrical connections to connect the cells in series. The battery has a minimized internal resistance, a capability for high discharge rates particularly suitable for the production of pulses of current, and a discharge efficiency far superior to conventional flat cell batteries at current densities exceeding 100 milliamperes per square inch of anode. These features are achieved by the adherence and electrical bonding one to the other of the confronting faces of the several conducting layers of the battery. The preferred form of the battery is discussed in terms of the LeClanche system.

13 Claims, 8 Drawing Figures

PATENTED NOV 6 1973 3,770,504

HIGH DISCHARGE RATE MULTICELL BATTERY

BACKGROUND OF THE INVENTION

1. Field of the Invention

This invention relates to a thin, flat, multicell battery characterized by a low internal resistance and resultant capability of being discharged at high rates.

2. Description of the Prior Art

Although flat, multicell batteries are known in the art, they leave much to be desired from the standpoint of achieving low internal resistance. For example, it has been proposed to produce voltaic piles by assembling a plurality of thin, electrolyte-containing tissue paper separators, each of which is coated on one side with zinc and on the opposite side with manganese dioxide (U.S. Pat. No. 2,701,272 - Reiner). Such batteries, however, are characterized by an extremely high internal resistance.

It has also been proposed to produce a galvanic dry tape cell system in which the electrochemically active materials are contained within a continuous hermetically sealed, thin, flexible tape (U.S. Pat. No. 3,379,574 - Grulke et al.), and discontinuously to arrange the electrochemically active materials in such a tape to form separate, discrete cells along the length of the tape (U.S. Pat. No. 3,494,796 - Grulke et al.).

Another approach has been to minimize the interelectrode spacing to reduce internal resistance (U.S. Pat. 3,421,944 - Bauer). It has also been proposed to augment the compactness of a battery of multiple layer construction by attaching the separator layer directly to at least one electrode (U.S. Pat. No. 3,304,203 - Nordvik).

The need to apply compressive forces to a flat, multicell battery and to maintain the battery under compression during use in order to minimize the internal resistance of the battery has long been known, and numerous approaches have been suggested to achieve that end (see, e.g., U.S. Pat. Nos. 2,519,054-Woodring; 2,658,098 - Coleman et al.; 2,666,803 - Kurlandsky; 2,745,894 - Nowotny; 2,870,235 - Soltis; 2,968,686 - Duddy; and 3,353,999 - Osborn). However, the use of tapes, bands, straps and encapsulators or other means to impart compressive forces to the battery increases manufacturing costs. Moreover, the degree of compressive force that is applied to the battery components is often difficult to maintain constant throughout the life of the battery. Since the electrical characteristics of such batteries vary with the degree of compressive force that is applied, especially at high discharge rates, variations in the applied force are undesirable. Also, as the thickness of the battery decreases, the practicality of using tapes, bands, straps or encapsulators diminishes, since the compressive forces that are desired to minimize the internal resistance of such batteries may often be of a magnitude sufficient to cause the battery to buckle, as would a sheet of paper to which external pressure is sought to be applied by means of a rubber band.

SUMMARY OF THE INVENTION

The present invention contemplates the provision of a thin, flat, multicell battery characterized by a minimized internal resistance that is attained without the use of tapes, bands, straps, shrinking encapsulation, or of other means of applying compressive force to the battery components. It has been discovered that this result is unexpectedly achieved by the establishment of electrical interconnection of the confronting faces of the several conductive layers of the battery, characterized by the adherence of the confronting faces one to another. Such adherence has been found to assure the resultant electrical bonding of the conductive particles in one of the conductive layers of the battery with the conductive particles in the adjoining conductive layer, and consequently to minimize the internal resistance of the battery without need of applying any external pressure.

As used herein, and as will be apparent from the following description, the references to the adherence, to the electrical bond between, or to the electrical bonding together of the confronting faces of the several conductive layers of the battery are to be taken to mean to make secure an adequate electrical connection between the adjacent layers internally ahered one to the other to insure low resistance passage of current (ionic or electronic) between them.

According to the invention, a flat multicell battery is provided that is characterized not only by a low internal resistance and capable of a high discharge rate, but also by good structural integrity and flexibility. Generally speaking, the multicell batteries of the invention include a plurality of series-connected cells comprising a multiplicity of electrically conductive layers which include, for each cell, a positive electrode layer, a negative electrode layer, and an electrolyte-containing layer disposed between and separating the positive and negative electrodes. Adjacent cells of the battery are electrically connected one to the other by means of an electrolyte impervious intercell connector layer that is disposed between and in contacting relationship with each pair of adjacent cells. The battery also includes a pair of current collector layers, one of which is disposed in contact with the positive terminal electrode and the other of which is disposed in contact with the negative terminal electrode.

In accordance with the invention, the confronting faces of each adjacent pair of conductive layers forming the battery are adhered and electrically bonded one to the other, including not only the electrode and separator layers, but also the intercell connector layers and the externally accessible current collectors. According to one form of the invention, each cell is sealed at the peripheral faces of the intercell connector layers which extend beyond the electrodes disposed therebetween to provide a liquid impervious seal around each cell.

In a preferred form of the invention, the thickness of the electrically conductive layers forming each cell is of the order of five hundreths of an inch or less. In this connection, it has been discovered that multicell batteries of the LeClanche type having positive electrode layer thicknesses of the order of 0.025 inch are, in the absence of the application of any external pressure to the battery, characterized by a cathode efficiency of at least 5 percent on continuous current drains of 200 milliamperes per square inch of anode, the voltage per cell during the entire time of application of the aforesaid current drain being at least 1 volt. Moreover, four-cell LeClanche batteries produced in accordance with one form of the invention have been found capable of producing at least 11 pulses of 1.1 seconds duration with a load of 3.3 ohms at a voltage of at least 4 volts, the rest interval between pulses being 3 seconds.

According to another form of the invention, each electrode layer comprises a binder matrix containing electrochemically active material, and each intercell connector layer comprises a non-conductive matrix containing electrically conductive material. In this embodiment, means including said matrices are provided for adhering together the confronting faces of each pair of adjacent layers formed by said matrices. There are further provided bonding means for adhering together the confronting faces of each of the electrolyte-containing layers with the adjacent electrode layers. In this manner, there is established throughout the battery adherence between all of the confronting faces of the conductive layers forming the battery with the desired electrical bonds therebetween.

DESCRIPTION OF THE PREFERRED EMBODIMENTS

Figure 1:
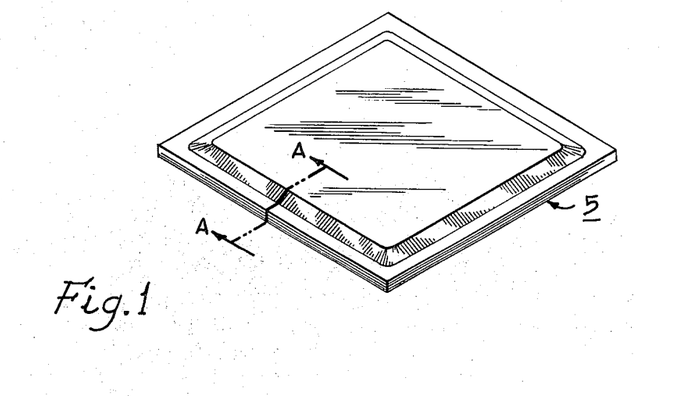
FIG. 1 is a pictorial view of a sealed, multicell battery embodying the present invention.

Referring now to the drawings, the invention in one form has been shown as applied to a thin, flat, multicell battery 5 which, as shown in FIG. 1, is approximately square although it may be rectangular or any other desired configuration. In the embodiment shown in FIG. 2, the battery 5 includes a vapor impervious wrapper or envelope comprising wrapper layers 60 and 70 (as of steel, for example) which provide a liquid impervious seal around the cells and which function as current collectors. Use of metallic wrapper layers such as 60 and 70 is optional, however, as will be apparent from the description which follows.

Figure 2:
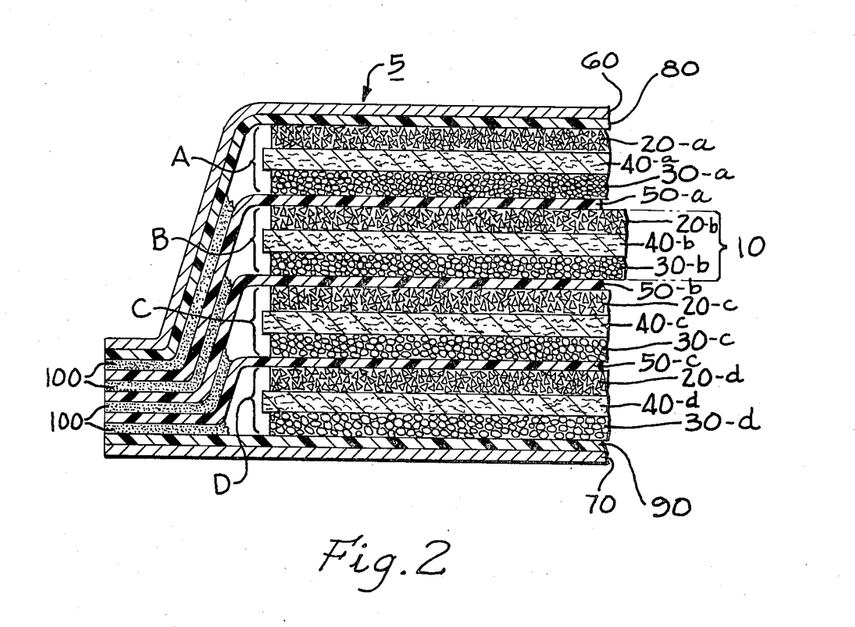
FIG. 2 is a greatly magnified fractional cross section of the battery taken along line A—A of FIG. 1.

The battery shown in FIG. 2 comprises four cells, A, B, C and D, separated one from another by electrolyte impervious intercell connector layers 50a, 50b and 50c, each of which extends outwardly beyond the cell structures and forms part of a peripheral, liquid impervious seal at each edge of the battery 5. A pair of inert, liquid impervious, electrically conductive layers 80 and 90 are adhered to the terminal electrodes 20a and 30d of end cells A and D respectively. Suitable insulating adhesive material 100 borders each intercell connector layer (50a, 50b and 50c respectively) at the peripheral faces thereof to cooperate therewith in providing a liquid tight seal. Wrapper layers 60 and 70 surround the cells on the outside of the conductive layers 80 and 90 respectively.

Where the battery 5 is of the LeClanche type, the positive electrode layers 20a, 20b, 20c and 20d will include manganese dioxide as the positive active material, and the negative electrode layers 30a, 30b, 30c and 30d will include zinc as the negative active material. Each of the four cells (A, B, C, and D) also includes an electrolyte-containing layer (40a, 40b, 40c and 40d respectively) which separates the positive electrode from the negative electrode of each cell, and which preferably comprises a porous separator saturated or impregnated with an acidic solution of ammonium chloride and/or zinc chloride.

The present invention contemplates the selection of positive and negative electrode active materials and electrolytes in accordance with the preferred techniques and know-how of those skilled in the art to provide not only low internal resistance to the battery but also efficient utilization of the active materials of the electrodes in the production of high discharge rates. Though examples of the electrode and electrolyte compositions are set forth below, such compositions in and of themselves do not achieve the desired minimized internal resistance and consequent high discharge rate unless the layers are electrically bonded together as taught by this invention.

In accordance with the present invention, electrical bonds are provided at the confronting faces of all of the electrically conductive layers of the battery. Thus, in the embodiment shown in FIG. 2, the wrapper layers 60 and 70 are electrically bonded to the adjacent layers 80 and 90, respectively; the layers 80 and 90 are electrically bonded to the respective layers 20a and 30d. The positive electrodes 20a, 20b, 20c and 20d are electrically bonded to the electrolyte-containing layers 40a, 40b, 40c and 40d, respectively. The latter are, in turn, electrically bonded to negative electrode layers 30a, 30b, 30c and 30d, respectively. The latter negative electrode layers are electrically bonded to intercell connector layers 50a, 50b, and 50c respectively. In turn, the intercell connector layers are electrically bonded to positive electrode layers 20b, 20c, and 20d, respectively.

By establishing throughout the battery adherence between the respective confronting faces of the several electrically conductive layers forming the battery, and thus providing the electrical bonds therebetween, it has been discovered that a high performance rate battery may be achieved which is superior to batteries of the prior art. Notably, the batteries of the invention can be produced wherein the total thickness of the electrically conductive layers forming each cell is five hundreths of an inch or less. If desired, thinner batteries in which the thickness of each cell, together with an intercell connector layer does not exceed five hundreths of an inch may also be produced.

By virtue of their thinness and structural integrity the high discharge rate batteries of the invention are characterized by good flexibility rendering them suitable for use in numerous applications.

In accordance with the invention, the electrical bonds between the confronting faces of the several layers of the multicell battery are achieved in various ways which are in part dependent upon the compositions of the respective layers. For example, the conductive layer 80 is preferably formed of a plastic material which is impervious to electrolyte and which is electrochemically inert in the sense that it will not cause any undesirable chemical reactions within the battery during storage and use. Thus, layer 80 can comprise a non-conductive matrix, as of a thermoplastic material such as polyvinyl chloride, for example, so thoroughly impregnated with conductive particles, as of carbon, for example, as to exhibit a low resistance to the flow of current from one face to the opposite face thereof. In such case, the thermoplastic material may provide the desired bond between layers 60 and 80 by being directly bonded to the face of the steel wrapper layer 60, as by laminating techniques. If desired the desired electrical bond may be achieved with the aid of other bonding means, such as a conductive adhesive as, for example, metal filled epoxies.

The positive electrode layers 20 comprise manganese dioxide in the form of fine particles dispersed or suspended in a binder matrix. The binder in which the particulate manganese dioxide of the positive electrode layer 20 is dispersed functions to increase the structural integrity of the positive electrode layer and also cooperates with the conductive plastic layer 80 in establishing a good electrical bond 20-80 throughout the confronting faces of layers 20a and 80. The adherence or bonding that is achieved between the binder matrix of positive electrode layer 20a and the conductive plastic of adjacent layer 80 appears to bring into contact the conductive particles at the interface between the two layers, or at least to optimize the electrically conductive paths between the two adjacent layers with the end result of achieving an extraordinarily low resistance path from one layer to the next adjacent layer.

The binder or matrix in which the electrochemically positive particles of electrode layers 20 are dispersed or suspended may comprise, for example, polyvinyl acetate, styrene butadiene rubber, polychloroprene, epoxy resins, polyvinyl chloride, acrylonitrile rubber, polyisobutylene, polyethylene, and ethylene vinyl acetate.

The positive electrode layers 20 include conductive particles, as of carbon or graphite, for example, to improve the electrical conductivity between the particles of electrochemically positive material which themselves are poor conductors. The conductivity of the particulate positive active material and that of the binder itself, i.e., the conductivity of the mixture of active material plus the binder, will generally influence the amount of conductive particles that is used to provide the electrode layer 20.

To afford the electrolyte maximum access to the surfaces of the particles of active material in the electrode layers 20, the electrode is made sufficiently porous to permit the electrolyte to diffuse throughout the layers 20. Porosity in the electrode can be achieved in any well-known manner as, for example, by including in the electrode mix a volatile fluid which is evaporated during construction of the electrode leaving a porous layer. Alternatively, porosity may be imparted by adding to the components of the electrode layer (including the binder, active material and conductive material in particulate form) particles of a solid material (such as salt, for example) which can be removed subsequent to the formation of the electrode layer by exposure of that layer to a solvent (such as water, for example) in which the solid material is soluble, but in which the remaining components of the electrode layer are insoluble. The resulting electrode layer is rendered porous upon removal of the particulate solid material by exposure of the electrode layer to the solvent in which the particulate solid material is soluble. Other methods of imparting porosity to the electrode layers 20 will readily occur to those skilled in the art.

Where the construction of the positive electrode involves the evaporation of liquid from a mixture including the particulate positive active material, volatile liquid, binder, and conductive particles, the electrical bond between the positive electrode layer and the intercell connector layer may generally be achieved by depositing the positive electrode mix including the foregoing components in contact with the intercell connector, and subsequently evaporating the volatile liquid from the electrode layer. Heat and/or pressure may also be used to establish the electrical bond between the electrode layer and the intercell connector layer, particularly where the positive electrodes are of the type wherein the pores are produced by the dissolution or leaching-out of a solid to impart porosity to the preformed electrode layer.

The theoretical requirements of electrolyte-containing separator layers 40a, 40b, 40c, and 40d are that they contain electrolyte as well as physically separate and prevent contact between the surrounding electrodes. A deposit of gelled electrolyte could by itself serve both functions if of proper thickness and/or consistency. The alternative construction uses a deposit of gelled or fluid electrolyte with a separator which is distinct from and in addition to the electrolyte, the separator providing added insurance against direct contact between the electrode and acting as an absorbent material into which the electrolyte may be impregnated. Both alternative constructions may, however, be viewed as being forms of electrolyte-containing separator layers. Where the separator is distinct from and in addition to the electrolyte, the separator may be made from a wide variety of materials including the fibrous and cellulosic materials which are conventional in battery construction as well as from woven or non-woven fibrous materials such as polyester, nylon, polypropylene, polyethylene and glass. These electrolyte containing layers may also include materials for inhibiting gas evolution, such as mercuric chloride, for example. If desired, such gas inhibitors may be included in other layers of the battery.

The electrical bond 20-40 between the confronting faces of layers 20a and 40a, can be established through the aid of a bonding gel, such as polyvinyl alcohol, methyl cellulose, or any one of a wide variety of starches utilized as bonding agents in the battery industry. Where the separator layers 40 are formed of a woven or non-woven material that is compatible with and will adhere to the positive electrode layers 20, such separate bonding means may not be required. In general, such bonding agents when used can be included within the separators 40 along with the electrolyte. Preferably, the electrolyte is included within the bonding gel.

A similar electrical bond 40—30 at the confronting faces of the electrolyte-containing separator layer 40a and the negative active material layer 30a may be established in the same manner as electrical bond 20-40, or a different bonding gel may be utilized.

The negative electrode layer 30a comprises electrochemically active negative material (zinc, in the case of the LeClanche system) which may be in the form of particulate metallic particles contained in and dispersed throughout a porous binder matrix as shown in FIG. 2. Alternatively, the negative electrode layer 30a can comprise thin sheets or foils of electrochemically active material (which can be adhered to the layer 50a by means of a conductive adhesive as described above,) or a thin layer of metal as may be obtained by metallized spray or vacuum deposition techniques. Where a porous binder matrix is used in conjunction with particulate metallic particles, the same considerations as discussed above with respect to the positive electrode matrix will generally apply, although, conductive additives, such as carbon or graphite particles, are not needed to enhance the electrical conductivity of the negative particles which are better conductors than the additives.

The conductive, electrolyte impermeable intercell connector layer 50 can be formed of the same non-conductive plastic matrix containing electrically conductive material (i.e., conductive plastic) as the layer 80, in which case the binder in the negative electrode layer 30a can cooperate therewith to establish the electrical bond 30—50 between the confronting faces of layers 30a and 50a. Alternatively, electrical bond 30—50 between the negative electrode layer 30a and the conductive plastic intercell connector layer 50a can be established through the use of other bonding means, such as a suitable conductive adhesive as, for example, metal filled epoxy interposed between the negative electrode and intercell connector. If desired, the intercell connector layers 50a—50c can be formed of a metal whose outer surfaces are electrochemically inert (as, for example, titanium). In such case, the electrical bond 30–50 may be achieved either by the adhesion by the binder in the negative electrode layer 30a, or by a conductive adhesive interposed between them. Such electrochemically inert metal intercell connector layers include those in which the inert metal comprises the entire thickness of the layer, as well as those in which an electrolyte impervious deposit of inert metal appears on the exterior surfaces of a metal such as zinc, which otherwise would be electrochemically active in the battery.

It is an important feature of the invention not only to establish the several bonds between the layers 80 and 20a, 20a and 40a, 40a and 30a, and 30a and 50a as described in connection with cell A, but also to establish similar electrical bonds between the intercell conductors 50b and the positive electrode layer 20b, and between the confronting faces of all of the remaining layers forming the cells B, C, and D, with the final electrical bond being between the layer 90 and the steel wrapper layer 70.

Figure 3:
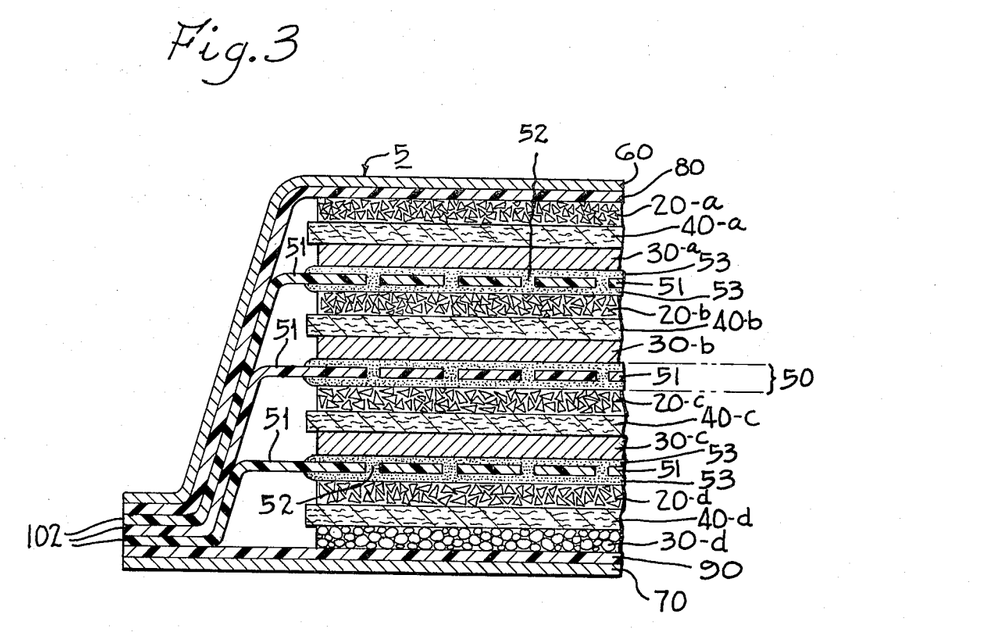
FIG. 3 is a greatly magnified cross-sectional view similar to that shown in FIG. 2 but illustrating a modified form of the invention.

FIG. 3 illustrates a modfied form of multicell battery 5 of the invention which differs from the construction shown in FIG. 2 by the composition of the intercell connector layers 50 and by the means by which liquid impervious seals are established around the peripheral faces of the intercell connector layers. The intercell connector layers 50 include a non-conductive plastic material 51 such as polyvinyl chloride, for example, which is impervious to the electrolyte and electrochemically inert. The negative electrode layers 30 a, 30b and 30c, as shown in FIG. 3, comprise sheets or foils of zinc. In the region substantially coextensive with the length and breadth of the electrodes adjacent each intercell connector 50, each non-conductive plastic member 51 is provided with a multiplicity of apertures, as at 52, and is coated with a conductive adhesive material 53. The conductive adhesive 53 is applied to permeate through the apertures 52 and functions to establish the electrical bonds between the adjacent electrodes of each respective cell. Thus, in the region coextensive with adjacent layers 30b and 20c, the conductive adhesive 53 functions to provide the desired electrical bonds between those layers and assures a low resistance path for the flow of electrical current between the respective cells.

Since the plastic material 51 within the intercell connectors 50 is non-conductive in the region extending beyond the length and breadth of the cell, they may be sealed one to the other without the need of an insulating adhesive 100 as was used in the embodiment illustrated in FIG. 2. Accordingly, non-conductive members 51 may be heat sealed directly to each other and cooperatively associated with the conductive plastic layers 80 and 90, and with wrapper layers 60 and 70, to provide the desired liquid impervious seal around the battery.

As will be appreciated by those skilled in the art, batteries are often kept in storage for extended periods of time before they are used. If during such periods the liquids within the battery escape as vapor, the battery is rendered incapable of achieving its desired performance when later placed into use. Accordingly, the multicell batteries of the invention may include the provision of a vapor impervious wrapper sealed around the battery. Additionally, the batteries may, during discharge, produce liquid by-products which are corrosive, poisonous, or otherwise harmful, and it is therefore desirable to prevent liquids of this character from escaping from the battery. Accordingly, the multicell batteries of the invention may include sealing means for preventing or at least minimizing the loss of liquids from the battery during storage and use.

The multicell batteries of the invention are also provided with conductor layers 80 and 90 for conducting electrical current between the terminal electrodes (20a and 30d in FIG. 2) and the exterior of the vapor impervious wrapper layers 60 and 70. While the vapor impervious wrapper layers 60 and 70, which also act as current collectors, should preferably extend around the cells of the battery, these current collectors may be limited in size if desired so that they extend across some of the outer conductor layers 80 and 90 to which they are electrically bonded.

Figure 4:
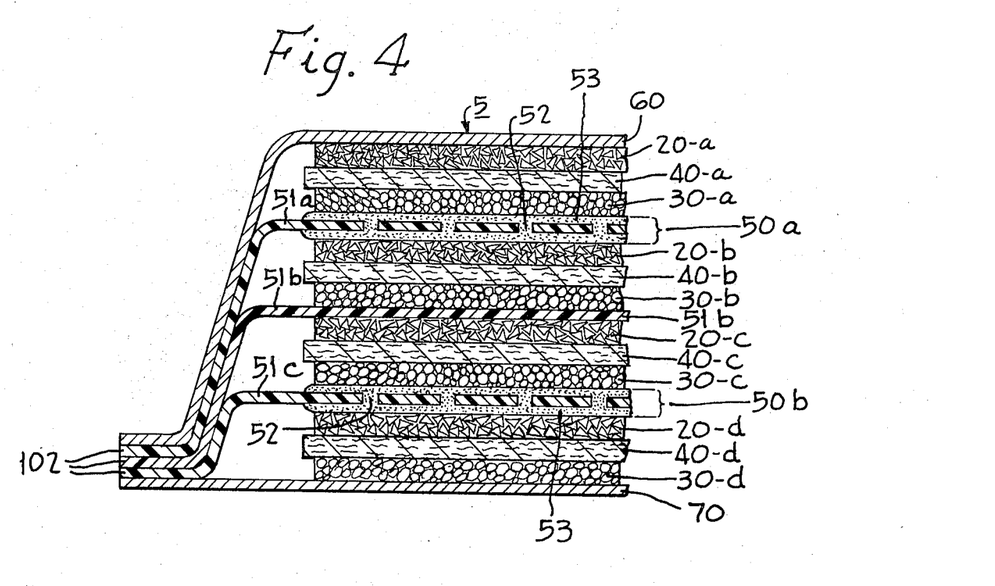
FIG. 4 is a greatly magnified cross-sectional view similar to that shown in FIG. 3, but illustrating a further embodiment of the invention.

As will be appreciated from FIGS. 2, 3 and 4, several alternative constructions may be used which simultaneously meet the vapor and liquid containment and the current collecting and current conducting requirements referred to above. One construction meeting these requirements is shown in FIGS. 2 and 3, where there is illustrated a laminate of a metal layer 60 with a sheet of an electrically conductive plastic layer 80, and a second laminate of a metal layer 70 with an electrically conductive plastic layer 90. Such laminated layers may be formed by adhering the metal layers through the aid of heat and pressure. Alternatively, the current collectors may be sprayed, vacuum deposited or electro-deposited upon the plastic layers.

In such laminated constructions, the conductive plastic members 80 and 90 function as the current conductors and liquid impervious containers. The metal layers 60 and 70 function as the vapor impervious wrappers as well as the means for collecting current. Based upon the recognition that the metal layers 60 and 70 may be bonded directly to the conductive plastic members 80 and 90 respectively through the application of heat and pressure, the laminated assemblies of layers 80 and 90 with metal layers 60 and 70 respectively comprise units each of which functions simultaneously as the current conductor, the outside wrapper or vapor barrier, the liquid barrier, and means for collecting current. The metal layers and the conductive plastic layers each serve as moisture barriers thus providing, in combination, a vapor and liquid barrier outside each end cell, and thereby contributing to the extended shelf life in the resulting battery. A further advantage of the combination of an exterior metal layer laminated to an interior conductive plastic layer adjacent the terminal electrodes is the fact that the conductive plastic layers tend to be good conductors of electricity across their thickness, but not along their lengths, while the metal layers conduct electricity well in all directions and therefore serve nicely to collect current to some terminal point.

Other constructions which are alternatives to that shown in FIGS. 2 and 3 may be used to satisfy the wrapper and current conducting means requirements of batteries produced in accordance with the invention. On such alternative is shown in FIG. 4, which illustrates a multicell battery 5 of the invention including moisture impervious wrapper or envelope layers 60 and 70 bonded to terminal electrodes 20a and 30d respectively. The electrical bonds between layers 60 and 70 and the respective terminal electrodes 20a and 30d respectively, are established by the binder matrix in the electrode layers, or by the use of a suitable conductive adhesive, or both. As shown, layers 60 and 70 in FIG. 4 comprise metallic foils or sheets whose surfaces exposed to the electrode layers 20a and 30d and to the electrolyte, are electrochemically inert. Such metallic wrapper layers may be formed entirely of an electrochemically inert metal, such as titanium, for example, or can be formed of a metal such as copper or zinc, for example, having an impermeable deposit of electrochemically inert metal on at least the surfaces exposed to the terminal electrode layers 20a and 30d and to electrolyte.

Another alternative construction for providing the current conductor-moisture impervious wrapper function includes a construction which differs from FIG. 2 and 3 to the extent that the exterior members 60 and 70 are formed of an electrically insulating, or non-conductive material, and the inner electrically conductive members 80, 90 serve as the current collectors and electrically conductive means, as of metal or conductive plastic, extend through or beyond the exterior members 60 and 70 to conduct the current to the exterior of the wrapper.

As further shown in FIG. 4, intercell connectors 50a and 50b are of the type illustrated in FIG. 3, i.e., they each include a non-conductive, liquid impervious plastic film material (51a, 51c) such as a co-extruded film, which is electrochemically inert. In the regions substantially coextensive with the length and breadth of the electrodes 30a and 20b which are adjacent to intercell connector 50a, and in the region coextensive with the length and breadth of the electrodes 30c and 20d which are adjacent to intercell connector 50b, each of the plastic films 51a and 51c is provided with a multiplicity of apertures, as at 52, and is further coated with a conductive adhesive material 53. The conductive adhesive 53 is applied to permeate through the apertures 52 and functions to establish the electrical bonds between the adjacent electrodes of each of the respective cells. Thus, in the region coextensive with adjacent layers 30a and 20b and between adjacent layers 30c and 20d, the adhesive 53 functions to provide the desired electrical bonds between the intercell connector layers 50a and 50b and the respectively adjacent electrode layers, and assures a low resistance path for the flow of electrical current between the respective cells.

As further shown in FIG. 4, intercell connector layer 51b is of the same type as the intercell connectors 50a, 50b and 50c illustrated in FIG. 2, i.e., is formed of a liquid impervious, electrically conductive material such as carbon-filled polyvinyl chloride, for example.

As will be seen from FIG. 4, the plastic film layer 51a serves to insulate conductive layers 60 and 51b from one another in the peripheral region of the battery. In the same fashion, plastic film layer 51c serves to insulate conductive layers 51b and 70 from one another in the aforesaid peripheral region of the battery. Since layers 51a and 51c are formed of an insulating or non-conductive material, the liquid impervious seal at the peripheral region of the battery 5 can therefore be established without the aid of any insulating adhesive as was utilized in the embodiment shown in FIG. 2. Accordingly, the respective layers 60, 51a, 51b, 51c and 70 can be sealed to each other to provide the desired moisture impervious seal.

Although the exact structural nature of the electrical bonds between each of the respective layers comprising the batteries of the invention is not thoroughly understood, it is believed that their nature, as described above, explains the new results achieved by their presence. Thus, in the assembly of the battery as shown in FIG. 2, the electrical bonding of the various components seems to establish a multiplicity of conducting paths through and across the length and breadth of the confronting faces of each pair of layers by the electrical interconnection of the conductive particles of each layer that are in the region of the interface between the layers. Accordingly, from the positive current collector layer 60 of the battery to the negative current collector layer 70, there is a minimized internal resistance of the battery. Moreover, the electrical characteristics of the batteries of the invention are substantially unaffected by the absence of compressive forces applied to the battery in the sense that the electrical performance of the battery will not substantially vary with the application of external pressure.

While in the preferred form of the invention the electrical bonds should be established between all confronting faces of the several conductive layers forming the flat multicell battery, it has been found that in constructions such as illustrated in FIGS. 2 and 3 the bonds established between the wrapper layers 60 and 70, and the adjacent layers 80 and 90 are of substantial importance. It has been found in this connection that if only one such bond is omitted, the measured impedance of the battery will increase nearly 70 times.

The electrical bonds present between the intercell connector layers and the confronting faces of the respective positive and negative electrodes of the adjacent cells are also of particular importance. If the bonds between two of the positive electrode layers (20a and 20b) and the respectively adjacent conductive plastic layers (80, 50a) are omitted, the measured impedance can exhibit nearly a 12 fold increase, and the closed circuit voltage of a four cell, 6 volt battery of the LeClanche type can decrease from a value of about 5 volts, when the electrical bond is present, to a value of about 2 volts, when the electrical bond has been omitted, as will become readily apparent from Table I below.

To demonstrate the importance of each of the several electrical bonds between the confronting faces of the conductive layers forming a four cell, 6 volt, multicell battery of the LeClanche type prepared in accordance with the present invention, and to illustrate the substantial insensitivity of the electrical characteristics of the batteries of the invention to the lack of applied pressure, tests were conducted to compare the performance of batteries of the invention with similar batteries in which the bonds between specific adjacent components were removed. The batteries that were tested were generally of the type illustrated in FIG. 2 referred to above.

The current collectors, or vapor impervious wrapper layers 60, 70, comprised 1.5 mil sheet steel (AISIC1008) tincoated (1/10–1/4 lb. per base box) and annealed.

The conductive plastic layers 80, 90 and 50 comprised thin sheets of electrolyte impervious non-conductive matrix material containing electrically conductive particles and specifically comprised a carbon filled vinyl film having a thickness of the order of 3 mils. Such films are sold commercially by Pervel Industries under the trade designation "Condulon."

The separator layers 40 comprised separator paper (33 lb. Kraft paper) sheets having a thickness of approximately 3 mils.

The electrolyte utilized comprised a mixture obtained by blending 2,356 grams of zinc chloride, 5,180 grams of ammonium chloride and 16,000 grams of distilled water. The electrolyte paste was prepared by combining 632 grams of mercuric chloride and 24 grams of Methocel MC (a methyl cellulose sold commercially by Dow Chemical Company).

The negative electrode layers 30 comprised flame-sprayed zinc.

The positive electrode layers 20 comprised a mixture of 400 grams of a carbon-loaded Latex base (sold commercially under the trade designation "Eccocoat SEC" by Emerson & Cuming, Inc.), 800 grams of electrolytic manganese dioxide, 4 grams of Cab-O-Sil (a precipitated, hydrated silica sold commercially by the Cabot Corporation) and 500 grams of distilled water.

Assembly of the battery was begun by bonding the metal layers 60 and 70 directly to the conductive plastic members 80 and 90 respectively through the application of heat and pressure. Specifically, the conductive plastic layers were bonded to the steel current collectors at 350° F. and under 500 psi pressure for about 15 seconds. The conductive plastic layers as well as the laminate assembly were then cut into pieces 3.42 inches by 2.75 inches. Cathode application was achieved by first thoroughly admixing the cathode ingredients to form a smooth slurry and then coating them onto one side of the conductive plastic, and onto the conductive plastic face of some of the laminate pieces, using a 15 mil steel stencil with an opening of 2.07 inches by 2.74 inches centered on the conductive plastic. The stencil was then removed and the coating was dried for 15 minutes at 60°C. The resulting dry cathode layer was of the order of about 7 mils thick and adhered well to the conductive plastic substrate.

Insulator seal windows (corresponding to the seals 100 of FIG. 2) formed of a double-faced, cold bond polyester film, sold commercially under the trade designation "Mac-Tac IS0706" by the Morgan Adhesive Company, and measuring 2.75 inches by 3.42 inches externally, and 2.25 inches by 2.92 inches internally, were then centered on and adhered to each face of the conductive plastic pieces, and to the conductive plastic faces of each laminate piece. A piece of release paper was left on the exposed surface of each insulator-seal piece.

Anode application was achieved by flame-spraying zinc onto the face of the conductive plastic pieces opposite the cathode and onto the conductive plastic side of the laminate pieces which did not contain cathodes, to a thickness of about 2 mils. The release paper on the seal-insulator served as a mask during the flame-spraying operation to prevent contamination of the adhesive.

Assembly of the battery was achieved by first brushing a thin layer (about 0.5 gram) of the electrolyte gel onto the cathode on the laminate assembly. A separator piece (measuring 2.25 inches × 2.92 inches) damp with electrolyte was then placed on the gel and centered over the electrode. Electrolyte gel (again about 0.5 gram) was brushed onto the anode side of the duplex electrode (anode-conductive plastic-cathode) insulator seal assembly, and the release paper pieces were removed from around the two gel covered electrodes. The duplex electrode was then placed onto the gel coated cathode so that the facing anode and cathode were in alignment. The insulator-seal pieces were pressed together around the electrode.

The foregoing process was then repeated beginning with the application of the electrolyte gel to the cathode of the duplex electrode just placed. When three duplex electrode assemblies were placed, the stack was completed by placing a seal-anode-laminate piece instead of a duplex electrode.

The following techniques were employed for removing bonds between specific pairs of adjacent battery components:

The electrical bonds between the steel wrapper layer (60 or 70) and the conductive plastic layer (80 or 90) was destroyed by delaminating the plastic layer and then placing the parts against each other. Otherwise the battery was prepared as described as above.

The electrical bond between the negative electrode and the conductive plastic layer was removed by flame-spraying zinc onto a glass plate, removing the zinc foil thus formed and placing it against the conductive plastic. Otherwise the assembly of the battery was as described above.

The electrical bond between the separator layer and the adjacent positive electode layer was omitted by omitting the bonding gel from the electrolyte mixture used to coat the positive electrode. Similarly, the electrical bond between the negative electrode layer and the separator was omitted by omitting the bonding gel from the mixture used to coat the negative electrode. Otherwise the battery was prepared as described above.

The electrical bond between the positive electrode and the conductive plastic layer was removed by spraying the manganese dioxide-binder-carbon mixture on release paper, removing it from the release paper, and applying it against the conductive plastic layer. Otherwise the assembly was prepared as above.

The test data obtained are set forth in Table I below. All batteries were tested at 0 lbs. pressure, 1 lb. pressure and 10 lbs. pressure. The open-circuit voltage, designated in Table 1 as "OCV" was measured on a Darcy 330 digital multimeter. The impedance, designated in Table 1 as "IMP" was measured on a ROV impedance meter at 1,000 cycles per second utilizing a Ballentine electronic voltage meter Model 300. The closed circuit voltage, designated in Table 1 as "CCV", was measured on a Brush Mark 20 recorder and designates the battery voltage at the end of one pulse discharge for 1.1 second through a 3.3 ohm resistor.

curred when the bonds were removed between the negative mix patches (items 30 in FIG. 2) and the conductive plastic layers (items 70, 80, 90 and 50 in FIG. 2). The same was true with respect to the bonds that were removed between the separator layers (items 40 in FIG. 2) and the adjacent negative and positive mix patches (items 30 and 20 in FIG. 2). The application of pressure to the batteries tested did increase the closed circuit voltages, but not to the values obtained, without pressure applied, from the bonded control battery of the invention wherein all of the electrical bonds were intact.

The impedance test that was used indicates internal resistance of the batteries tested. The impedance val- TABLE I.—Effects of Removing Bonds in Multicell Battery Shown in Figure 2; Electrical Characteristics v. Pressure Placed on Battery

| Bond(s) removed at interface(s) between following layers (see Figure 2) | No pressure | | | 1 lb. pressure | | | 10 lbs. pressure | | |
|---|---|---|---|---|---|---|---|---|---|
| | OCV[a] | IMP[b] | CCV[c] | OCV | IMP | CCV | OCV | IMP | CCV |
| None removed (control) | 6.37 | 1.10 | 5.01 | 6.30 | 0.97 | 5.06 | 6.25 | 0.90 | 5.20 |
| 70–90 | 6.36 | 75 | 1.20 | 6.35 | 32 | 2.40 | 6.32 | 4.8 | 3.50 |
| 30–d–90 | 6.37 | 1.30 | 4.79 | 6.31 | 1.07 | 4.84 | 6.27 | 0.99 | 4.94 |
| 30–d–90 and 30–a–50–a | 6.36 | 1.75 | 4.40 | 6.31 | 1.40 | 4.60 | 6.27 | 1.08 | 4.80 |
| 30–d–90; 30–a–50–a; and 30–b–50–b | 6.35 | 2.85 | 3.91 | 6.31 | 1.85 | 4.20 | 6.26 | 1.17 | 4.56 |
| 30–d–90; 30–a–50–a; 30–b–50–b; and 30–c–50–c | 6.34 | 2.20 | 3.89 | 6.28 | 1.62 | 4.14 | 6.25 | 1.40 | 4.28 |
| 30–a–40–a and 30–b–40–b | 6.35 | 3.65 | 4.44 | 6.25 | 2.37 | 4.56 | 6.25 | 1.68 | 4.84 |
| 30–a–40–a; 30–b–40–b; 30–c–40–c; and 30–d–40–d | 6.32 | 4.55 | 3.95 | 6.19 | 4.20 | 3.96 | 6.22 | 3.60 | 4.18 |
| 20–a–40–a; 20–b–40–b; and 20–c–40–c | 6.38 | 6.00 | 3.11 | 6.30 | 3.34 | 3.31 | 6.26 | 2.52 | 3.86 |
| 20–a–40–a; 20–b–40–b; 20–c–40–c; and 20–d–40–d | 6.38 | 4.10 | 3.40 | 6.29 | 3.60 | 3.50 | 6.22 | 2.34 | 4.05 |
| 20–a–80 | 6.48 | 6.7 | 3.37 | 6.35 | 6.1 | 3.45 | 6.32 | 5.6 | 3.56 |
| 20–a–80; and 20–b–50–a | 6.48 | 12.3 | 2.12 | 6.35 | 11.7 | 2.10 | 6.30 | 11.3 | 2.10 |

As will be appreciated by those skilled in the art, the most significant electrical characteristic in Table I to be compared is the closed circuit voltage (CCV). CCV determines whether the battery-using device will operate effectively. The higher the CCV, the better are the device operating characteristics. In the specific test to compile the data set forth in Table I, the device employed will not operate below 4.00 volts. At least eleven pulses will be required from the battery. Correlation testing established that eleven pulses would not be obtained if the first CCV was below 4.40 volts.

As can be seen from Table I, the control battery, i.e., battery of the invention with all bonds intact, had the highest CCV. This was the case whether no pressure, or up to 10 lbs. of pressure, was applied to the batteries that were tested.

As is further apparent from Table I, the absence of the bond between the steel current collector (item 70 in FIG. 2) and the adjacent conductive layer (item 90 in FIG. 2) reduced the CCV the greatest amount. The next greatest reduction occurred when one or two bonds were removed between the positive mix patches (items 20 in FIG. 2) and the conductive plastic layers (items 80, 90, and 50 in FIG. 2). In the case of these two bond locations (20a–80 and 20b–50a), not even the application of pressure up to 10 lbs. to the batteries tested would compensate for the removal of the bonds. The CCV, even when the batteries tested were subjected to extra pressure, did not rise above the end point of 4.0 volts.

Significant, but to a lesser extent, CCV drops ocues in Table I clearly show that the battery of the invention, (the control) had the lowest internal resistance.

Since the open circuit voltages as measured are not influenced by internal resistance of the battery, no difference between the fully bonded construction and the partially bonded construction was expected or is shown by the results.

Figure 5:
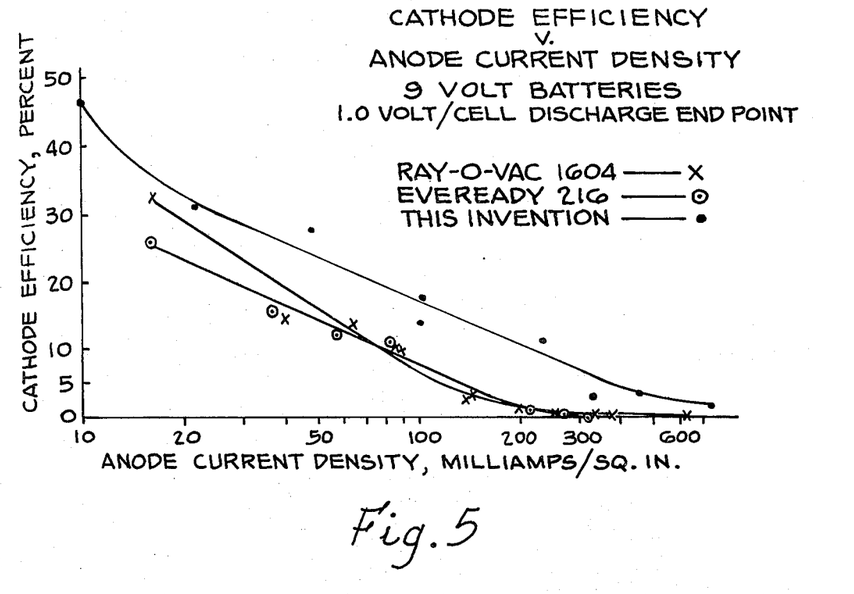
FIG. 5 is a graph setting further the results of tests comparing the performance of batteries produced in accordance with the invention with the performance of flat cell batteries of the prior art.
Figure 6:
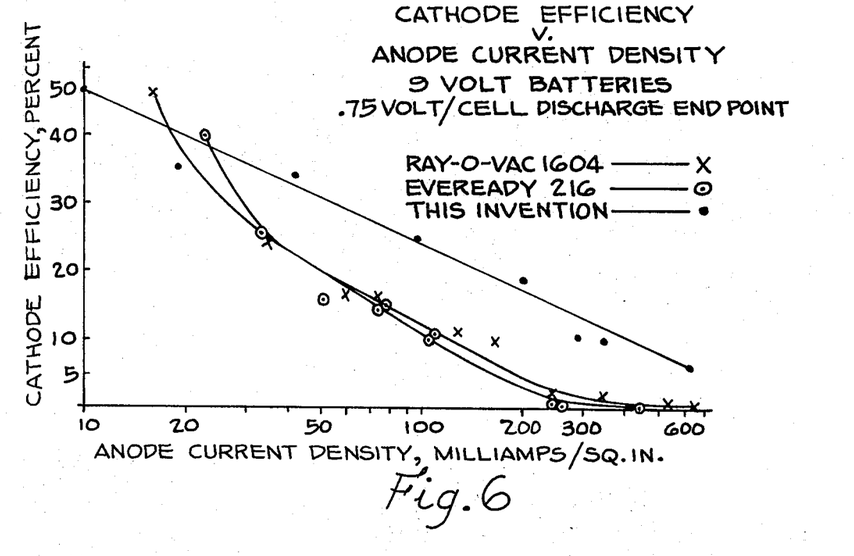
FIG. 6 is a graph similar to FIG. 5.

FIG. 5 graphically compares the cathode efficiencies of two conventional prior art batteries with the cathode efficiencies of thin, flat, multicell batteries of the invention at various anode current densities, to voltage end points of 1.0 volt per cell. FIG. 6 is similar to FIG. 5, except that it sets forth the results of test data obtained when the discharge end point was lowered to 0.75 volt per cell.

The two prior art batteries tested were both nine volt batteries of the type identified by the National Electronic Distributors Association Number 1604. The first consisted of a Ray-O-Vac 1604 battery; the other consisted of an Eveready "216." The thin, flat, multicell batteries of the invention that were tested comprised six cell, 9 volt flat batteries having an internal construction of the type exemplified by FIG. 2 above, except, of course, that they included two additional cells.

As can be seen from FIGS. 5 and 6, to voltage end points of 1.0 volt or 0.75 volt, the thin, flat, multicell batteries of the invention were far superior in percent cathode efficiencies on current drains of at least from 25 milliamperes per square inch of anode to over 600 milliamperes per square inch of anode. At discharge rates of 200 milliamperes per square inch of anode, the end point voltage being 1 volt, the multicell batteries of the invention exhibited a cathode efficiency well in excess of 5 percent, whereas the prior art batteries exhibited efficiencies of the order of 2 or 3 percent. In point of fact, the efficiency of the battery of the invention (at the 200 milliampere per square inch of anode drain rate, as shown in FIGS. 5 and 6.) was over 10 percent, or between three and five times greater than that of the prior art batteries.

Figure 7:
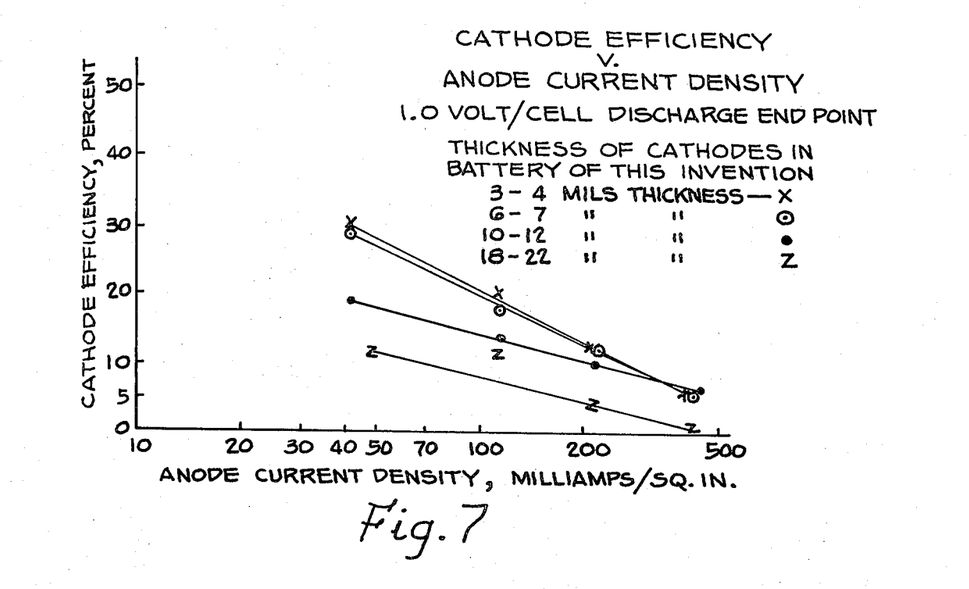
FIG. 7 is a graph comparing the electrical performance of different embodiments of the invention.

FIGS. 6 and 7 graphically compare the cathode efficiency of various batteries of the invention constructed in different thicknesses, which in FIGS. 6 and 7 are expressed in terms of the thickness of the cathode layers. FIG. 7 shows the result of tests conducted to a discharge end point of one volt, whereas FIG. 8 reports the results of tests conducted to a 0.75 volt end point.

Figure 8:
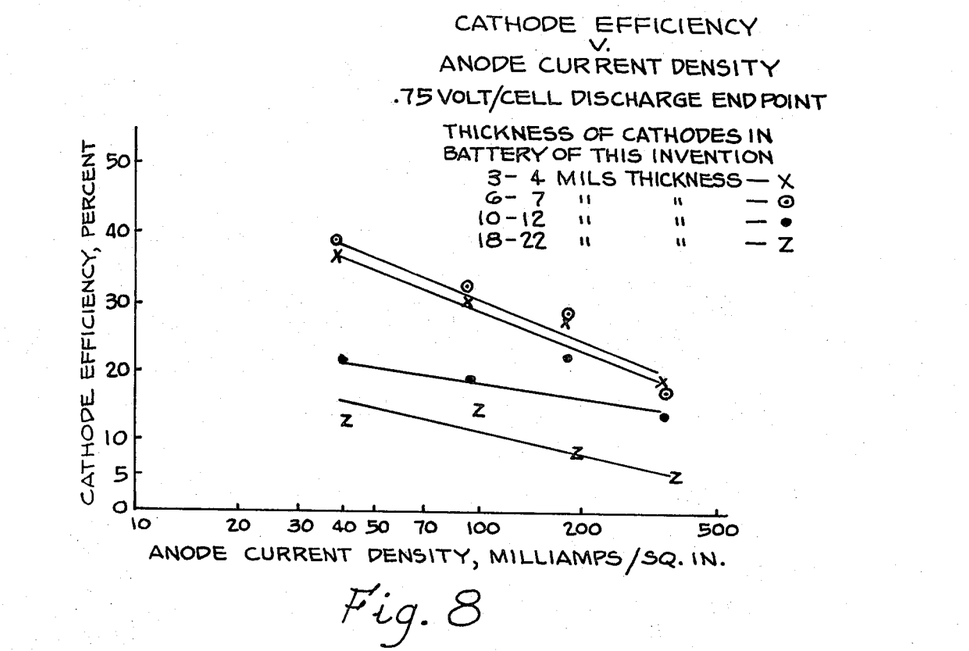
FIG. 8 is a graph similar to FIG. 7.

As is apparent from the comparison of FIGS. 7 and 8 with FIGS. 5 and 6, multicell batteries of the invention in which each cathode layer ranges in thickness of from about 0.010 inch to about 0.012 inch have discharge efficiencies superior to conventional flat cell batteries at current densities exceeding 45 milliamperes per square inch of anode. Multicell batteries of the invention including cathode layers whose thickness ranges from about 0.018 to about 0.022 inch have discharge efficiencies superior to the conventional prior art batteries at current densities higher than 90 milliampers per square inch of anode.

As will be appreciated by those skilled in the art, therefore, by constructing the batteries of the invention with positive electrode layers (i.e., cathode layers) of less than about 0.025 inch, there can be established a cathode efficiency of at least 10 percent on current drains of 100 milliampers per square inch of anode, the voltage per cell during the current drain being at least one volt. Also, batteries of the invention may be constructed wherein the thickness of each positive electrode layer is less than 0.015 inch for establishing a cathode efficiency of at least 10 percent on current drains of 500 milliamperes per square inch of anode, the voltage per cell during the current drain being at least 0.75 volt.

While the preferred embodiment of the invention has been described with reference to the Le Clanche system, a wide variety of positive and negative electrode materials and electrochemical systems, including both primary and secondary systems, may be used to provide multicell batteries in accordance with this invention. Among the positive electrode materials that may be employed are the commonly used inorganic metal oxides, such as manganese dioxide, lead dioxide, nickel oxyhydroxide, mercuric oxide, and silver oxide; inorganic metal halides, such as silver chloride and lead chloride; and organic materials capable of being reduced, such as dinitrobenzene and azodicarbonamide compounds. Among the negative electrode materials that can be employed are the commonly used metals, such as zinc, aluminum, magnesium, lead, cadmium, and iron. As will be appreciated by those skilled in the art, the particular electrolyte used will be selected to be compatible with the positive and negative electrodes, as well as other components that are employed. With the appropriate electrodes, the electrolytes will therefore include those commonly used in the Le Clanche system (ammonium chloride and/or zinc chloride); various alkaline electrolytes, such as the hydroxides of potassium, sodium, and/or lithium that may be used in alkaline cell systems; acidic electrolytes such as sulfuric or phosphoric acid that may be used with other cell systems; and non-aqueous electrolytes. Other aqueous electrolyte systems, including those of nickel-zinc, silver-zinc, mercury-zinc, mercury-cadmium, and nickel-cadmium systems may also be used. In addition, systems employing organic positive electrodes and acidic electrolytes may also be used, including rechargeable systems using azodicarbonamide compound electrodes and Le Clanche electrolyte.

The present invention thus permits the production of extremely thin, flexible, high discharge rate multicell batteries characterized by a minimized internal resistance and optimized electrical characteristics which are substantially unaffected by the absence of compressive forces applied to the battery components. For example, the four cell Le Clanche battery of the invention (the "control" of Table I) prepared as described above, was 2.75 inches wide and 3.42 inches long. The thickness of the battery was about 0.10 inch. Recognizing that this thickness includes the thickness of the vapor impervious steel wrapper or envelope layers 60 and 70 as shown in FIG. 2, the average thickness of each of the four cells is seen to be less than 0.025 inch. Despite its extra-ordinary thinness, the battery was able to produce at least 80 pulse-type drains of 1.1 seconds duration (with a 3 second rest between pulses) with a load of 3.33 ohms at a minimum voltage to and including 4.00 volts when the 3.33 ohm load was applied.

The multicell batteries of the invention find particular utility in applications where very high current drains are required and are accordingly well suited for use in cameras, appliances, toys, tape recording cassettes, and in other applications that will readily occur to those skilled in the art. Still other applications not requiring high discharge rate, but utilizing the thin, flexible, physically integral, or pressure insensitive characteristics of the battery will occur to those skilled in the art.

It should be understood that while the present invention has been described in considerable detail with respect to certain specific embodiments thereof, it is not to be considered limited to those embodiments, but may be used in other ways without departure from the spirit of the invention or the scope of the appended claims.

What is claimed is:

1. A high discharge rate multicell battery including a plurality of series-connected cells comprising a multiplicity of electrically conductive layers arranged in cooperative electrical association with one another for establishing a multicell battery which, in the absence of external pressure applied to said conductive layers, is characterized by a cathode efficiency of at least 10 percent on a continuous current drain of 100 milliamperes per square inch of anode, the voltage per cell during the entire time of applying said current drain being at least 0.75 Volt, said electrically conductive layers including for each said cell a positive electrode layer separated from
a negative electrode layer by
an adhesive, ionically conductive, electrolyte-containing separator layer with its opposite faces adhering to the confronting faces of said electrode layers and providing ionic conductivity between them, said adherence of said confronting faces rendering the conductivity therebetween substantially independent of compressive forces developed by external application of pressure, an electrolyte impervious intercell connector layer disposed between each pair of adjacent cells, with its opposite faces adhered to the confronting faces of the electrodes of said adjacent cells, a pair of current collector layers one face of one of them being adherent to the confronting face of a positive electrode layer of one terminal cell and one face of the other of them being adherent to the confronting face of the negative electrode layer of the other terminal cell, said adherence between said intercell connector layers and between said current collector layers with their associated electrode layers rendering the conductivity therebetween substantially independent of compressive forces developed by external application of pressure, the peripheral faces of each intercell connector layer and each said current collector layer extending beyond the periphery of said positive and negative electrode layers, and means including said peripheral faces of said intercell connector layers and of said current collector layers providing an electrolyte impervious border seal around each cell without development of compressive forces upon said electrically conductive layers.

2. The multicell battery of claim 1 in which the thickness of said electrically conductive layers forming each cell does not exceed five hundreths of an inch.

3. The multicell battery of claim 1 in which the thickness of each cell together with an intercell connector layer does not exceed five hundreths of an inch.

4. The multicell battery of claim 1 in which each electrode layer comprises a binder matrix containing electrochemically active material.

5. The multicell battery of claim 1 in which the positive electrode comprises manganese dioxide, the negative electrode comprises zinc, and the electrolyte comprises an acidic solution of ammonium chloride and/or zinc chloride.

6. The multicell battery of claim 1 wherein each electrode layer comprises a binder matrix containing electrochemically active material and each intercell connector layer comprises a non-conductive matrix containing electrically conductive material, and means including said matrices for adhering together the confronting faces of each pair of adjacent layers formed by said matrices, and bonding means for adhering together the confronting faces of each said electrolyte containing layer and each adjacent electrode layer, for establishing throughout said battery adherence between said faces with said electrical bonds therebetween.

7. The multicell battery of claim 1 in which the thickness of each positive electrode layer dos not exceed 0.025 inch.

8. A thin, high discharge rate battery of the LeClanche type including a multiplicity of electrically conductive layers arranged in cooperative electrical association with one another for establishing a multicell battery which, in the absence of external pressure applied to said conductive layers, is characterized by a cathode efficiency of at least 5 percent on a continuous current drain of 200 milliamperes per square inch of anode, the voltage per cell during the entire time of applying said current drain being at least 1 volt, said electrically conductive layers comprising a plurality of series-connected cells each of which includes a positive electrode layer separated from a negative electrode layer by an adhesive, ionically conductive aqueous electrolyte-containing separator layer with its opposite faces adhering to the confronting faces of said electrode layers and providing ionic conductivity between them, said adherence of said confronting faces rendering the conductivity therebetween substantially independent of compressive forces developed by external application of pressure, an electrolyte impervious intercell connector layer disposed between each pair of adjacent cells, with its opposite faces adhered to the confronting faces of the electrodes of said adjacent cells, a pair of current collector layers one face of one of them being adherent to the confronting face of a positive electrode layer of one terminal cell and one face of the other of them being adherent to the confronting face of the negative electrode layer of the other terminal cell, said adherence between said intercell connector layers and between said current collector layers with their associated electrode layers rendering the conductivity therebetween substantially independent of compressive forces developed by external application of pressure, the peripheral faces of each intercell connector layer and each said current collector layer extending beyond the periphery of said positive and negative electrode layers, and means including said peripheral faces of said intercell connector layers and of said current collector layers for providing an electrolyte impervious border seal around each cell without development of compressive forces against the electrically conductive layers of each cell.

9. The multicell battery of claim 8 wherein the thickness of each positive electrode layer is less than 0.022 inch for establishing a cathode efficiency of at least 10 percent on current drains of 100 milliamperes per square inch of anode, the voltage per cell during the entire time of applying the current drain being at least 0.75 volt.

10. The multicell battery of claim 8 wherein the thickness of each positive electrode layer is less than 0.015 inch for establishing a cathode efficiency of at least 10 percent on current drains of 500 milliamperes per square inch of anode, the voltage per cell during the entire time of applying current drain being at least 0.75 volt.

11. The multicell battery of claim 8 including four cells cooperatively associated for producing at least 11 pulses of 1.1 seconds duration with a load of 3.33 ohms at a voltage of at least 4 volts, the rest interval between pulses being 3 seconds.

12. The multicell battery of claim 8 wherein each electrode layer comprises a binder matrix containing electrochemically active material and each intercell connector layer comprises a non-conductive matrix containing electrically conductive material, and means including said matrices for adhering together the confronting faces of each pair of adjacent layers formed by said matrices, and bonding means for adhering together the confronting faces of each said electrolyte-containing layer and each adjacent electrode layer, for establishing throughout said battery adherence between said faces with electrical bonds therebetween.

13. The multicell battery of claim 12 including four cells cooperatively associated for producing at least 11 pulses of 1.1 seconds duration with a load of 3.33 ohms at a voltage of at least 4 volts, the rest interval between pulses being 3 seconds.

* * * * *